United States Patent
Arima et al.

(10) Patent No.: US 7,269,780 B2
(45) Date of Patent: Sep. 11, 2007

(54) POWER MANAGEMENT FOR CIRCUITS WITH INACTIVE STATE DATA SAVE AND RESTORE SCAN CHAIN

(75) Inventors: Yukio Arima, Kadoma (JP); Koichiro Ishibashi, Warabi (JP); Takahiro Yamashita, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 302 days.

(21) Appl. No.: 10/674,951

(22) Filed: Sep. 30, 2003

(65) Prior Publication Data

US 2004/0088630 A1    May 6, 2004

(30) Foreign Application Priority Data

Oct. 2, 2002    (JP)    ............................. 2002-289999

(51) Int. Cl.
   *G11C 29/00*    (2006.01)
(52) U.S. Cl. ...................... 714/764; 714/746; 714/799; 714/727; 714/729; 714/797; 713/300; 713/310; 713/320; 713/324
(58) Field of Classification Search .................... None
   See application file for complete search history.

(56) References Cited

U.S. PATENT DOCUMENTS

| | | | | |
|---|---|---|---|---|
| 5,502,728 A | * | 3/1996 | Smith, III | ....................... 714/5 |
| 5,701,313 A | * | 12/1997 | Purdham | ..................... 714/764 |
| 5,761,489 A | * | 6/1998 | Broseghini et al. | ......... 712/227 |
| 5,784,628 A | * | 7/1998 | Reneris | ....................... 713/300 |
| 6,208,170 B1 | * | 3/2001 | Iwaki et al. | ................. 326/121 |
| 6,212,642 B1 | * | 4/2001 | Seiler et al. | ................. 713/324 |
| 6,493,257 B1 | * | 12/2002 | Coughlin et al. | ............ 365/156 |
| 6,510,528 B1 | * | 1/2003 | Freeman et al. | ................ 714/6 |

(Continued)

FOREIGN PATENT DOCUMENTS

JP    5-108496 A    4/1993

(Continued)

OTHER PUBLICATIONS

Kosonocky, S.V., et al., "Enhanced Multi-Threshold (MTCMOS) Circuits Using Variable Well Bias," *The International Symposium on Low Power Electronics and Design 2001*, Huntington Beach, California, Aug. 6-7, 2001, pp. 165-169.

(Continued)

*Primary Examiner*—Cynthia Britt
*Assistant Examiner*—John P. Trimmings
(74) *Attorney, Agent, or Firm*—Christensen O'Connor Johnson Kindness PLLC

(57) ABSTRACT

An integrated circuit device includes at least one functional module which outputs save data in synchronism with a saving clock signal, a power supply control unit which selects one of the functional modules, and controls stop and resumption of power supply to the selected functional module, a save data storage unit which stores save data output from a functional module selected by the power supply control unit, and an error checking and correction unit which performs error checking and correction for the save data stored in the save data storage unit when the save data is to be restored to the functional module in synchronism with a restoration clock signal.

4 Claims, 10 Drawing Sheets

U.S. PATENT DOCUMENTS

| | | | |
|---|---|---|---|
| 6,938,175 B2* | 8/2005 | Lee | 713/320 |
| 2002/0162037 A1* | 10/2002 | Wood et al. | 713/322 |
| 2003/0188241 A1* | 10/2003 | Zyuban et al. | 714/726 |

FOREIGN PATENT DOCUMENTS

| | | | |
|---|---|---|---|
| JP | 05-108496 A2 | 4/1993 |
| JP | 06-052070 A2 | 2/1994 |
| JP | 6-139153 A | 5/1994 |
| JP | 06-139153 A2 | 5/1994 |
| JP | 9-44277 A | 2/1997 |
| JP | 10-78836 A | 3/1998 |
| JP | 2000-82014 A | 3/2000 |
| JP | 2000-163320 A | 6/2000 |
| JP | 2001-350672 A | 12/2001 |
| JP | 2002-182803 A | 6/2002 |
| JP | 2002-196846 A2 | 7/2002 |

OTHER PUBLICATIONS

Shivakumar, P., et al., "Modeling the Effect of Technology Trends on the Soft Error Rate of Combinational Logic," *Proceedings of the International Conference on Dependable Systems and Networks*, Washington, D.C., Jun. 23-26, 2002.

\* cited by examiner

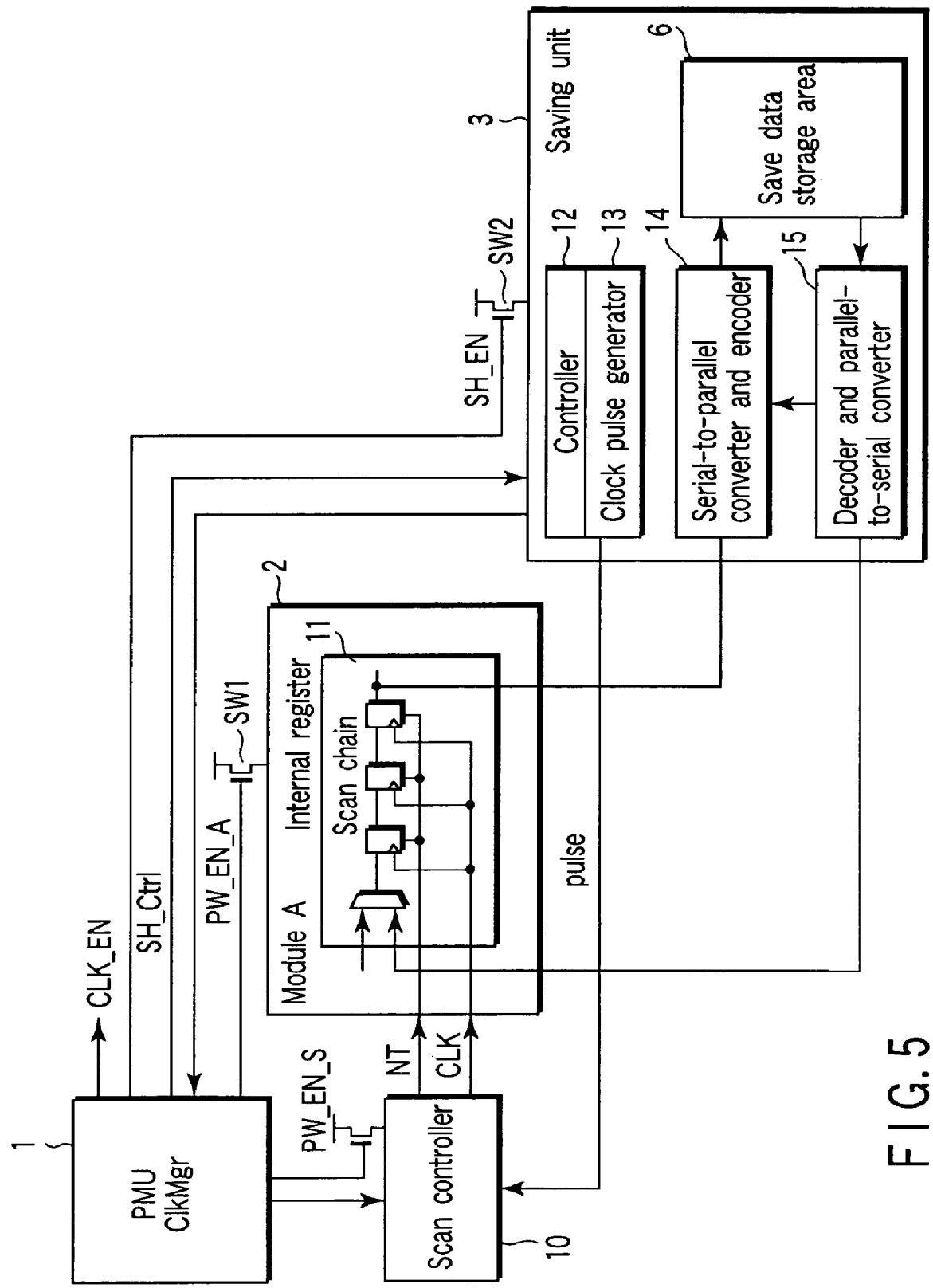
F I G. 5

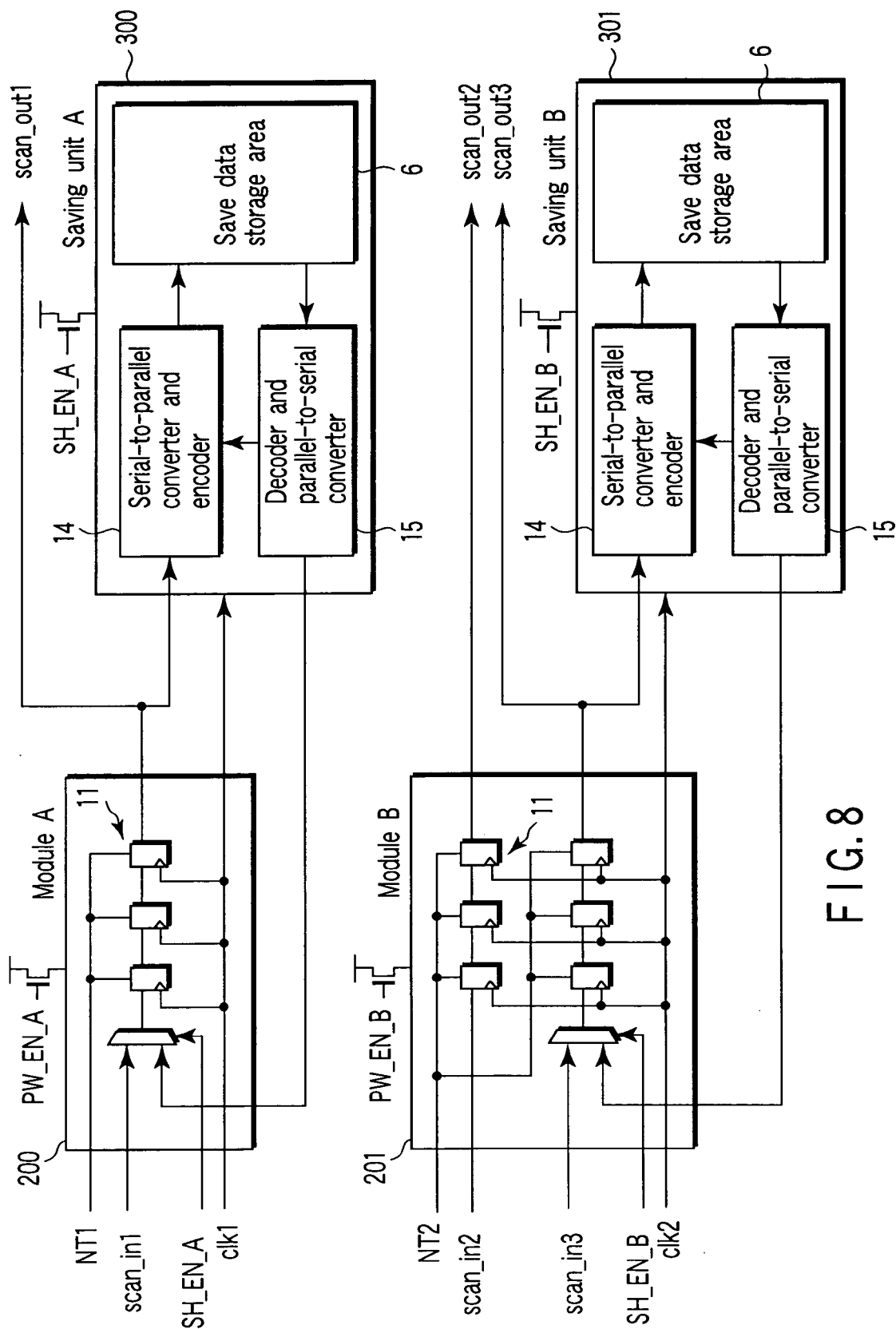
F I G. 8

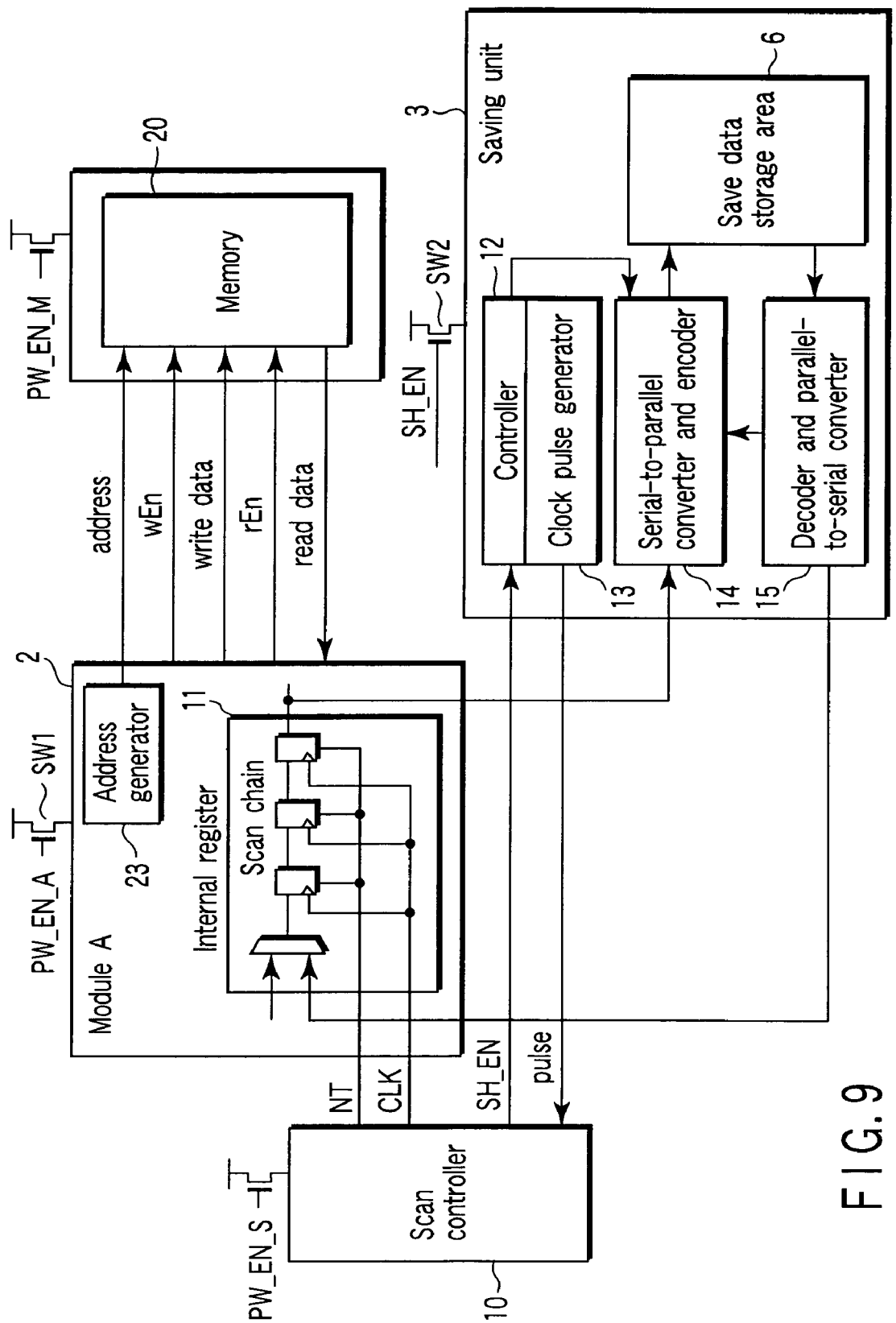
F I G. 9

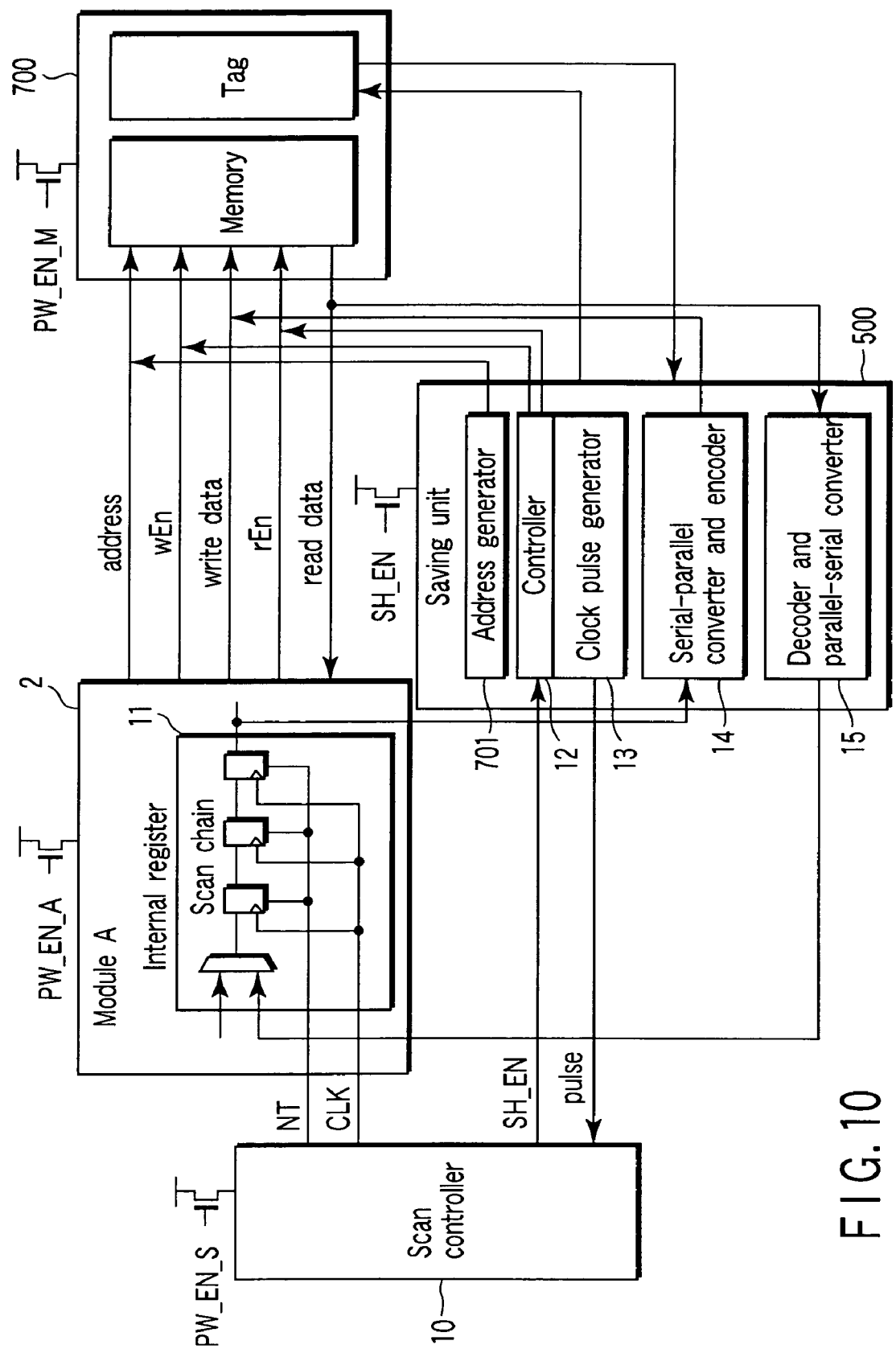
F I G. 10

POWER MANAGEMENT FOR CIRCUITS WITH INACTIVE STATE DATA SAVE AND RESTORE SCAN CHAIN

CROSS-REFERENCE TO RELATED APPLICATIONS

This application is based upon and claims the benefit of priority from the prior Japanese Patent Application No. 2002-289999, filed Oct. 2, 2002, the entire contents of which are incorporated herein by reference.

BACKGROUND OF THE INVENTION

1. Field of the Invention

The present invention relates to an integrated circuit device in which power supply is controlled for individual functional modules in order to reduce power consumption, and saving and restoration of data in an internal register or the like is controlled.

2. Description of the Related Art

A conventional method of implementing a low-power system on a chip (SoC) is to stop the operation of a functional module in an idling state in order to reduce power consumption. Stopping the clock is known as a method of stopping the operation of a functional module. However, even when the operation of a functional module is stopped by stopping the clock, power is kept supplied to the functional module itself, so power loss by leakage current cannot be prevented. To reduce this power loss by leak current, a method of stopping power supply to a functional module has been invented. The state in which a functional module is rendered inoperative because power supply has been stopped is called a sleep state.

When the power supply is shut down, all information held in a circuit is lost. To allow a functional module to return from the sleep state and resume the operation from the state immediately before sleep, a circuit arrangement which can hold data required after the return even though the functional module is set in the sleep state and power supply is stopped is indispensable. Methods proposed as a circuit arrangement such as this are a method in which, of circuit elements forming a functional module, power is always supplied to circuit elements for holding necessary data, and only power supply to other circuit elements is stopped, and a method in which necessary data is saved in another memory block or the like.

FIG. 13 is a circuit diagram showing such prior art. Referring to FIG. 13, logic circuits LA, LB, and LC are connected to a power supply VDD via switches SWA, SWB, and SWC, respectively. A flip-flop FF1 is connected between the logic circuits LA and LB, and a flip-flop FF2 is connected between the logic circuits LB and LC. These flip-flops FF1 and FF2 are also connected to the power supply VDD. The logic circuits LA, LB, and LC are equivalent to combinational circuits, and the flip-flops FF1 and FF2 are equivalent to sequential circuits. Power is always supplied to the flip-flops FF1 and FF2 to hold data so that the operation can be resumed after sleep from a state immediately before that. On the other hand, supply of power from the power supply VDD to the logic circuits LA, LB, and LC is shut down by turning off the switches SWA, SWB, and SWC as needed in order to reduce the power consumption. This prior art which thus controls the power supply method has the advantage that data need not be saved because power is always supplied to the flip-flops FF1 and FF2. Therefore, it is of course unnecessary to secure a storage area for data saving. However, as is apparent from FIG. 13, lines from the power supply VDD must be separated to those connected to the switches SWA, SWB, and SWC (logic circuits LA, LB, and LC) and those connected to the flip-flops FF1 and FF2. This makes the circuit layout very complicated. Also, NAND gates or the like must be added before the flip-flops FF1 and FF2 in order to prevent short circuit current. This undesirably increases the number of gates.

Note that prior art similar to that shown in FIG. 13 is described in Stephen V. Kosonocky, Mike Immediato, Peter Cottrell, et al.:

"Enhanced Multi-Threshold (MTCMOS) Circuits Using Variable Well Bias", Proceedings of the 2001 International Symposium on Low Power Electronics and Design pp. 165-169, 2001.

In addition, several techniques for data saving when power supply to a functional module is to be appropriately shut down in order to reduce the power consumption are proposed. In these prior art references, power supply to a functional module is entirely shut down after necessary data in the module is saved, unlike the above prior art in which only power supply to the logic circuits is shut down and power is always supplied to the flip-flops. Another prior art which also performs such data saving saves the contents of a memory in external storage (e.g., a hard disk) (Jpn. Pat. Appln. KOKAI Publication No. 2000-82014). This prior art is highly reliable because the use of a hard disk or the like suppresses errors in the data saving area. However, this method is not preferable because saving data to external storage device takes long time.

Still another prior art which performs data saving saves data of flip-flops in a ferroelectric memory (FRAM: Ferroelectric Random Access Memory) by using a scan chain (Jpn. Pat. Appln. KOKAI Publication No. 10-78836). This prior art can reduce leakage current during a standby operation and hence is suited to reducing the power consumption. However, this prior art is disadvantageous in cost because a process of generally embedding both logic circuit and the FRAM is necessary in fabrication.

When a volatile memory such as a DRAM is to be used as a data saving area instead of a nonvolatile memory such as the FRAM, even if the voltage supplied to the data saving area is set to a minimum voltage necessary to hold data in order to reduce the power consumption, it is preferable to suppress a decrease in reliability of the saved data caused by, e.g., a so-called soft error. A soft error is a phenomenon in which data held in a transistor is changed by electric charge generated by the influence of αrays or neutrons incident from the outside. The maximum electric charge amount generated by a rays or neutrons is about 15 to 150 fC. If the amount of electric charge held by a transistor is so large as not to be influenced by an electric charge of about 15 to 150 fC, no soft error occurs. To this end, however, the applied voltage to the circuit must be raised, and this means power consumption of circuits also increase.

In addition, the supply voltage for a transistor is lowered not only for low power consumption but also by recent process scaling. For example, the critical charge of a logic cell is reportedly about 10 fC in a 1.0-V operation in a 100-nm process (P. Shivakumar, D. Burger, et al.: "Modeling the Effect of Technology Trends on the Soft Error Rate of Combinational Logic", Intl. Conf. On Dependable System and Network, 2002). The critical charge is a charge amount with which data held by a transistor is lost if more electric charge is added. From the foregoing, a voltage 15 times the normal voltage must be applied to make the critical charge larger than the charge amount produced by neutrons. This indicates that it is practically impossible to avoid soft errors by raising the applied voltage since process scaling is presently advancing.

It is desirable to provide an integrated circuit device capable of flexibly controlling power supply for each functional module in order to reduce the power consumption, and capable of controlling saving and restoration of necessary data accordingly. It is more preferable to realize this apparatus at low cost without lowering the reliability of data saving.

BRIEF SUMMARY OF THE INVENTION

An integrated circuit device according to an aspect of the present invention is an integrated circuit device comprising at least one functional module which outputs save data in synchronism with a saving clock signal, a power supply control unit which selects one of the functional modules, and controls stop and resumption of power supply to the selected functional module, a save data storage unit which stores save data output from a functional module selected by the power supply control unit, and an error checking and correction unit which performs error checking and correction for the save data stored in the save data storage unit when the save data is to be restored to the functional module in synchronism with a restoration clock signal.

An integrated circuit device according to another aspect of the present invention comprises at least one functional module which has a plurality of flip-flops forming a scan chain, performs a saving operation by outputting data in the flip-flops by a shift operation using scan chain synchronized with a saving clock signal, and performs a restoring operation by restoring, to the flip-flops, the saved data by a shift operation using scan chain synchronized with a restoration clock signal, a power supply control unit which selects one of the functional modules, and controls stop and resumption of power supply to the selected functional module, a clock signal generator which generates a saving clock signal and restoration clock signal for the functional module selected by the power supply control unit, a scan controller which, in the saving operation or restoring operation, sets the functional module selected by the power supply control unit to a scan test mode, and selects the saving clock signal or restoration clock signal generated by the clock signal generator as a clock signal to be supplied for the shift operation using scan chain, a save data storage unit which stores the save data output from the functional module selected by the power supply control unit by the shift operation using scan chain synchronized with the saving clock signal, and an error checking and correction unit which performs error checking and correction for the save data stored in the save data storage unit when the save data is to be restored to the flip-flops of the functional module by the shift operation using scan chain synchronized with the restoration clock signal.

In the above configuration, the error checking and correction unit may comprise an encoder which generates an error correction code from the save data, and writes the error correction code in the save data storage unit, and a decoder which reads out the stored save data and the corresponding error correction code from the save data storage unit, and decodes the save data.

The error checking and correction unit may periodically perform error checking and correction for the save data stored in the save data storage unit.

The save data storage unit may store a plurality of copies of the save data, and the error checking and correction unit may perform error checking and correction by a majority operation using the plurality of copied data stored in the save data storage unit.

The clock signal generator may generate a clock signal for use in periodic error checking and correction performed in the save data storage unit.

The save data storage unit may be storage means for a built-in self-test circuit.

The integrated circuit device may further comprise a compressor which compresses the save data stored in the save data storage unit, and an expander which expands the save data compressed by the compressor when the save data is to be restored to the functional module.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

FIG. 5 is a block diagram showing the first embodiment of the integrated circuit device according to the present invention;

FIG. 8 is a block diagram showing an arrangement according to the second embodiment in which a saving unit is formed for each of a plurality of functional modules;

FIG. 9 is a block diagram showing the third embodiment (in which data is saved to a dedicated area) of the integrated circuit device according to the present invention;

FIG. 10 is a block diagram showing the fourth embodiment (in which data is saved to a RAM or cache) of the integrated circuit device according to the present invention;

DETAILED DESCRIPTION OF THE INVENTION

An embodiment of the present invention will be described below with reference to the accompanying drawing. This embodiment is suited to implementing a low-power system on a chip (SoC), and is directed to an integrated circuit device which, in order to reduce the power consumption, shuts down power supply to a functional module in an idling state and shifts the module to a sleep state. In the integrated circuit device of this embodiment, data is saved when power supply to a functional module is to be shut down, and the saved data is restored to the functional module in accordance with a predetermined event to return the module from the sleep state to the normal operating state.

Figure 1:
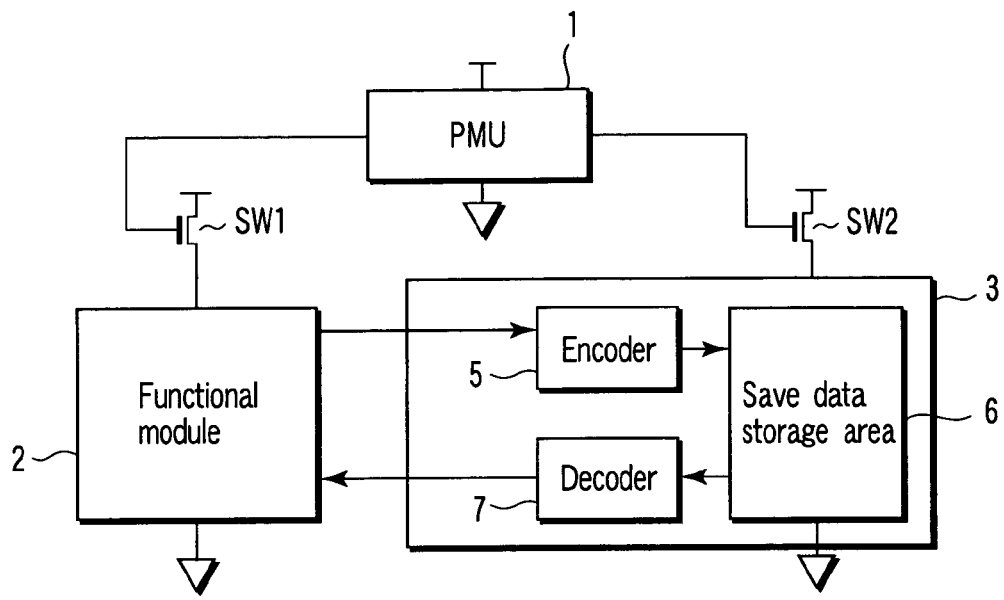
FIG. 1 is a block diagram showing the basic configuration of an integrated circuit device according to an embodiment of the present invention.

FIG. 1 is a block diagram showing the basic configuration of the integrated circuit device according to the embodiment of the present invention. In FIG. 1, reference numeral 1 denotes a power management unit (PMU); 2, a functional module; and 3, a saving unit. A power control signal line from the PMU 1 is connected to the control terminal of a switch SW1 of the functional module 2. The switch SW1 is turned on or off in accordance with a power control signal from the PMU 1, thereby controlling supply or shutdown of power supply to the functional module 2.

As shown in FIG. 1, the saving unit 3 includes an encoder 5, save data storage area 6, and decoder 7. When data is to be saved, the encoder 4 encodes output save data from the functional module 2 in synchronism with a saving clock signal in order to perform error checking and correction. The encoded data is output together with the save data to the save data storage area 6. The save data storage area 6 is, e.g., a volatile memory. As will be described later, the save data storage area 6 is a newly formed dedicated area or the existing memory area. Examples of the existing memory area are a DRAM and an SRAM which forms a cache memory.

The decoder 7 reads out and decodes the save data and corresponding encoded data stored in the save data storage area 6, and outputs error-corrected save data. This error-corrected save data obtained by the decoder 7 is restored to the functional module 2 in synchronism with a restoration clock signal. Although this error correcting operation is performed at least before save data is restored from the save data storage area 6 to the functional module 2, the operation is preferably periodically performed during the data saving period. In the arrangement shown in FIG. 1, power is always supplied to the saving unit 3. However, power is preferably supplied to the saving unit 3 only when it is in use, when the power efficiency is taken into consideration. Therefore, the device may also include a switch (SW2) for controlling power supply to the saving unit 3. In this case, similar to the switch SW1 of the functional module 2, a saving control signal line from the PMU 1 is connected to the control terminal of the switch of the saving unit 3. By turning on or off this switch in accordance with the saving control signal, the use (enable) state or non-use state of the saving unit 3 is controlled in accordance with the power supply state of the functional module 2.

Figure 2:
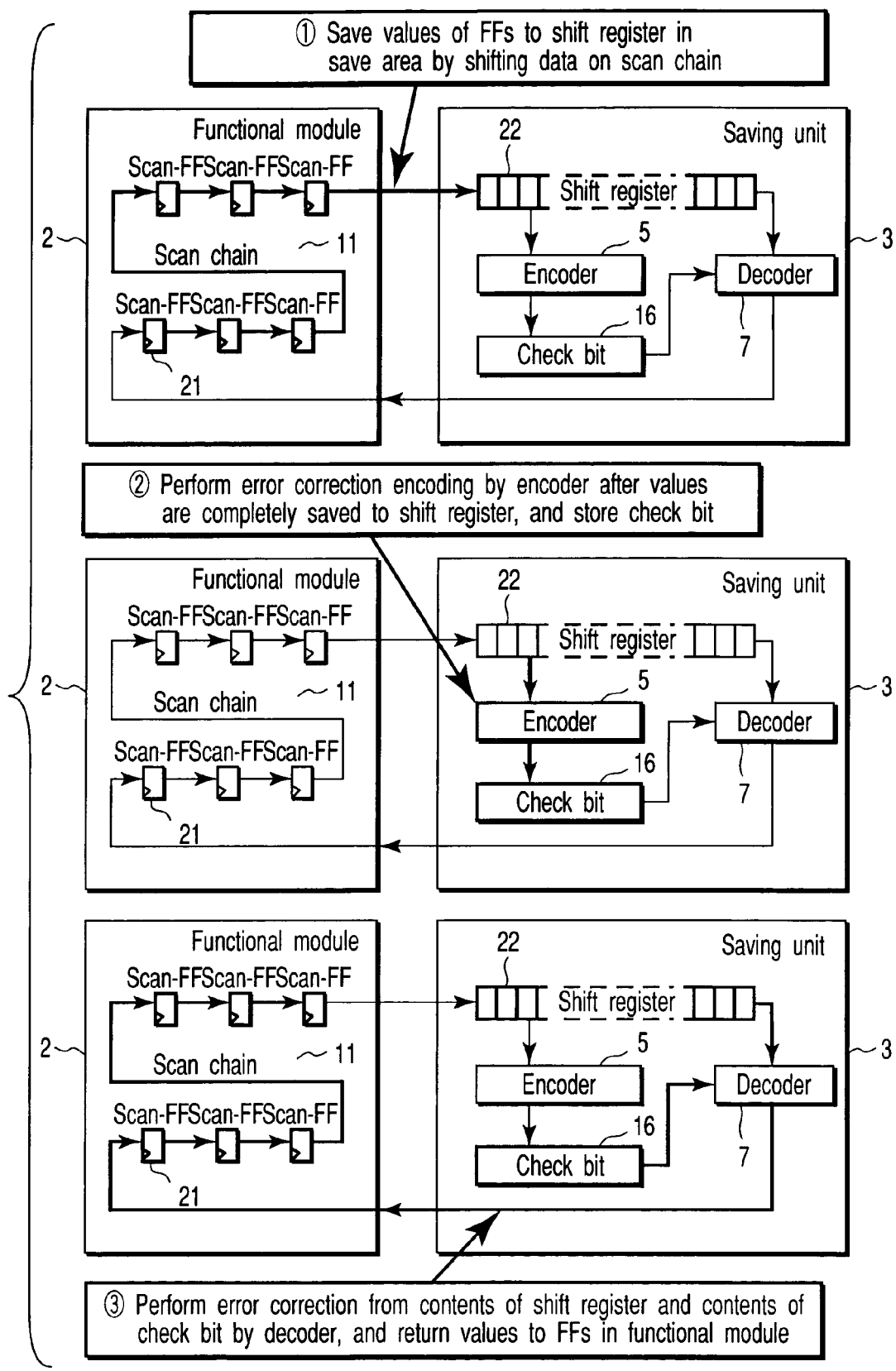
FIG. 2 is a view for explaining a data shift operation using a scan chain according to the embodiment of the present invention.
Figure 3:
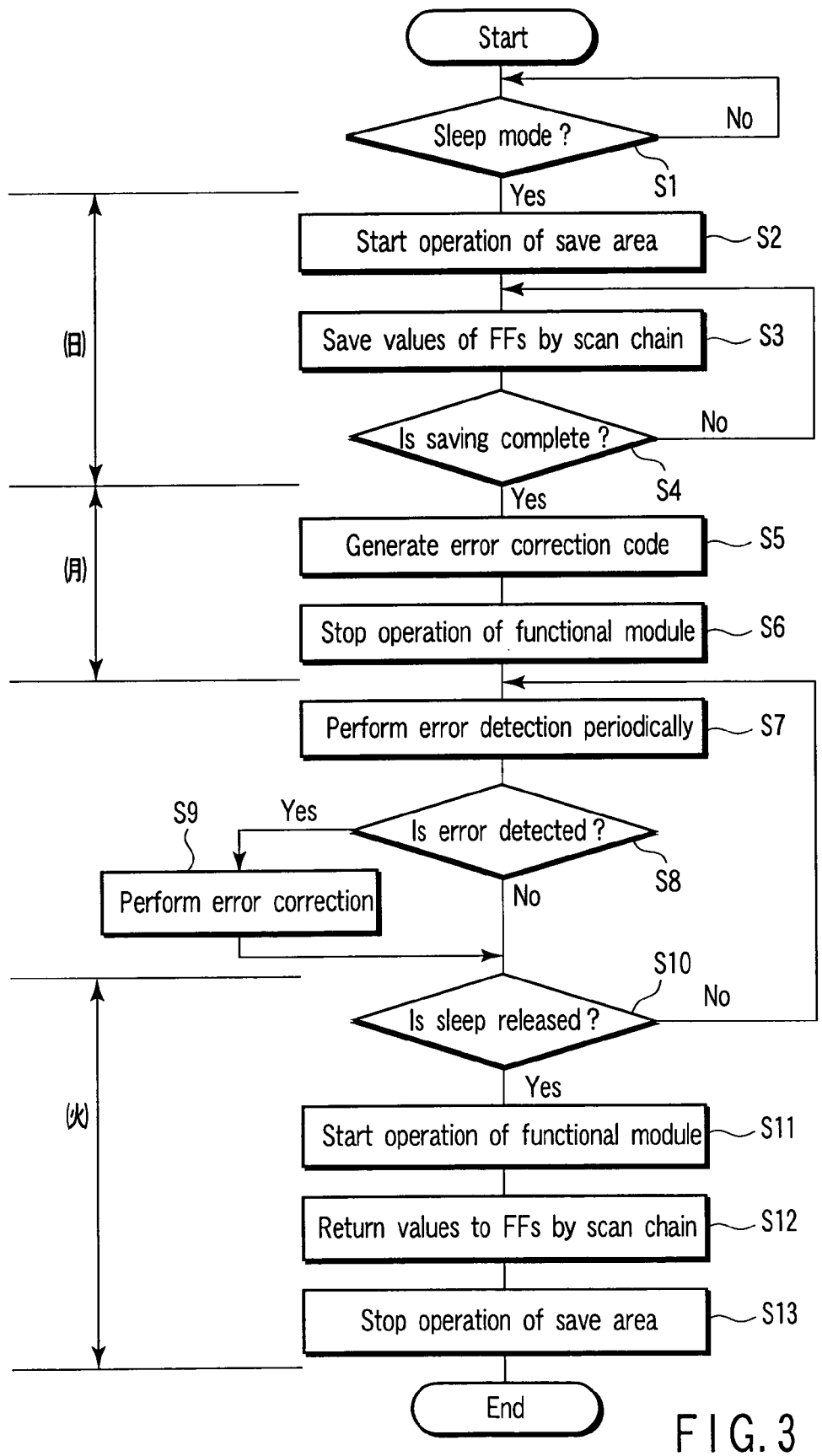
FIG. 3 is a flowchart showing the flow of processing pertaining to saving and restoration of data according to the embodiment of the present invention.

FIG. 2 is a view for explaining a data shift operation using a scan chain. FIG. 3 is a flowchart showing the flow of processing pertaining to data saving and restoration. As shown in FIG. 2, the functional module 2 has a plurality of flip-flops (Scan-FFs) 21, and the flip-flops 21 form a scan chain 11. The save data storage area 6 of the saving unit 3 forms a shift register 22 and is connected to the output terminal of the scan chain 11 when data is to be saved. Note that this arrangement using the shift register 22 as the save data storage area 6 is assumed for the sake of descriptive simplicity, so the present invention is of course not limited to this arrangement.

First, determination of transition to a sleep mode is performed (step S1). When the functional module 2 transits to the sleep mode, the saving unit 3 starts a saving operation (step S2). The functional module 2 shifts the scan chain 11 in synchronism with a saving clock signal, and outputs values held by the flip-flops 21 in turn. These output values from the flip-flops 21 are saved in the shift register 22 of the saving unit 3 in synchronism with the saving clock signal (step S3). The frequency of the saving clock signal can be as low as possible.

If the flip-flops (which form, e.g., an internal register of the functional module 2) holding values to be saved are connected together into one scan chain 11, the number of flip-flops required in the data save area, i.e., in the saving unit 3 and the number of clock cycles required for saving can be reduced to minimum necessary numbers.

Figure 4:
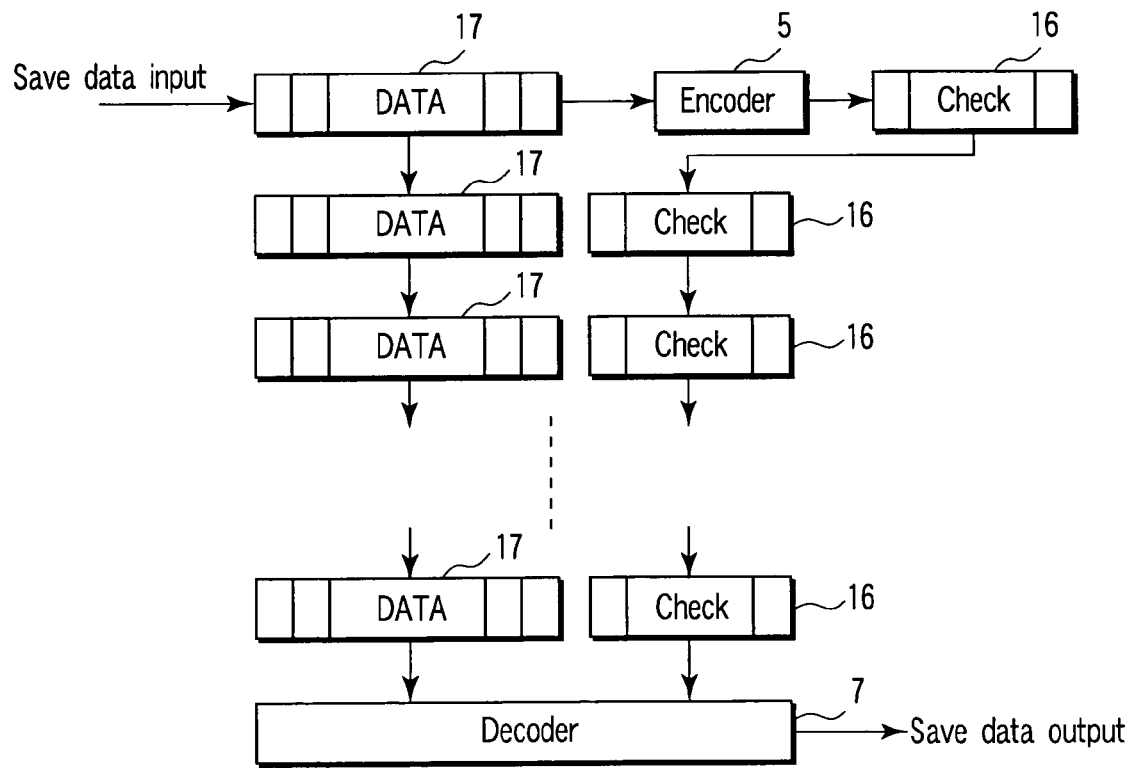
FIG. 4 is a view showing the flow of error checking and correction in a save data storage area according to the embodiment of the present invention.

In addition, although the flip-flops in the saving unit 3 can be connected in series as in the shift register 22 as shown in FIG. 2, they can also be divided into groups 17 each having a few bits as shown in FIG. 4. In this arrangement shown in FIG. 4, encoding for generating check bits 16 by the encoder 5 can easily be performed. Also, this arrangement shown in FIG. 4 is a kind of parallel-to-serial conversion, so the clock rates of most flip-flops in the saving unit 3 can be lowered. This is advantageous in reducing the power consumption.

The functional module 2 transits to the sleep mode when completely saving all necessary values of the flip-flops 21 to the saving unit 3 (step S4=YES). The saving unit 3 stops the shift operation of the shift register 22, and keeps holding the values saved from the functional module 2. If the voltage of the data save area, i.e., the operating voltage of the shift register 22 is lowered to a minimum voltage at which the shift register 22 can hold values, the power consumption can be advantageously reduced.

The operating state of the saving unit 3 except for periodic error checking and correction is of course a retention state. In this state, no transistor switching occurs in the circuit, so no electric power is consumed by switching. However, with the recent advance of semiconductor process scaling, power consumption by a subthreshold leak is no longer negligible. Since this subthreshold leak increases in proportion to the applied voltage, the applied voltage to the saving unit 3 is desirably minimized in order to achieve low power consumption. For example, a voltage of about 1.0 V is used in a normal operation in a 100-nm process. However, if it is only necessary to store data, this voltage can be lowered to about the threshold voltage (e.g., about 0.3 to 0.5 V) of a transistor.

In the saving unit 3, the encoder 5 encodes the data saved in the shift register 22 in order to perform error correction (step S5). As a consequence, an error correction code, i.e., the check bit 16 is generated. The generated check bit 16 is stored in a flip-flop (not shown) in the saving unit 3. Note that the storage area of the check bit 16 is not limited to a flip-flop.

Although the method of error checking and correction (ECC) is used in this embodiment, another appropriate method can also be used in accordance with the soft error occurrence probability. As an example, the method of SEC-DED can be used. SEC-DED is an abbreviation of "single error correction and double error correction" which is a coding method of performing a specific operation for a data bit string and code bit string. SEC-DED can correct an error of one bit. If an error of two bits occurs, SEC-DED can detect the occurrence of the error but cannot correct it.

After generating the error correction code (check bit 16) in step S5, the functional module 2 stops the operation in accordance with the sleep mode. That is, power supply controlled by the PMU 1 is temporarily shut down (step S6).

In the saving unit 3, it is also possible to periodically perform error detection for the values held in the shift register 22 (step S7) and, if an error is detected in step S8, correct the error by the decoder 7 (step S9). The reliability of saved data can be improved by this periodic error checking and correction.

When the sleep mode of the functional module 2 is released in step S10, the functional module 2 first resumes the operation (step S11). Subsequently, the saved data is read out from the shift register 22 of the saving unit 3, and the check bits 16 held in the flip-flops are also read out. By using these data, the decoder 7 performs decoding. The decoded data is error-corrected data.

This error-corrected saved data is transferred to the functional module 2 by a shift operation using the scan chain 11 and returned to the flip-flops 21 in a direction opposite to saving (step S12). When all the saved data is restored from the shift register 22 to the flip-flops 21 in the functional module 2, the functional module 2 returns to the state (normal operation mode) immediately before the transition to the sleep mode, and the saving unit 3 stops the operation and is turned off (step S13).

Various embodiments to which the above-mentioned basic arrangement of the integrated circuit device according to the present invention is applied will be described below.

First Embodiment

FIG. 5 is a block diagram showing the first embodiment of the integrated circuit device according to the present invention. The first embodiment is a more practical arrangement of the configuration shown in FIG. 1. As in the configuration shown in FIG. 1, a PMU 1 is the main component for managing power supply control and control of a saving process itself. The PMU 1 is usually installed in an integrated circuit device (LSI) aiming at low power consumption. The PMU 1 controls clock supply and power supply to functional modules 2, thereby minimizing the power consumption in a functional module 2 in an idling state. The PMU 1 can be implemented by software such as an OS (Operating System) or hardware. In either case, the PMU 1 controls clock supply and power supply to a specific functional module on the basis of the process history and waiting time in the integrated circuit device.

A plurality of functional modules 2 are managed by the PMU 1. The PMU 1 can select any functional module 2 to perform power supply control and saving control. In this embodiment, however, for the convenience of explanation, assume that only a functional module A has data to be saved in a sleep state, and other functional modules (not shown) such as a memory have no such data.

In the arrangement shown in FIG. 5, a saving unit 3 has a switch SW2 for controlling power supply to the saving unit 3. Similar to a switch SW1 of the functional module 2, a saving control signal line from the PMU 1 is connected to the control terminal of the switch SW2, and the switch SW2 is turned on or off in accordance with a saving control signal. Consequently, the use state (enable state) or the unused state of the saving unit 3 is controlled in accordance with the power supply state of the functional module 2.

Figure 6:
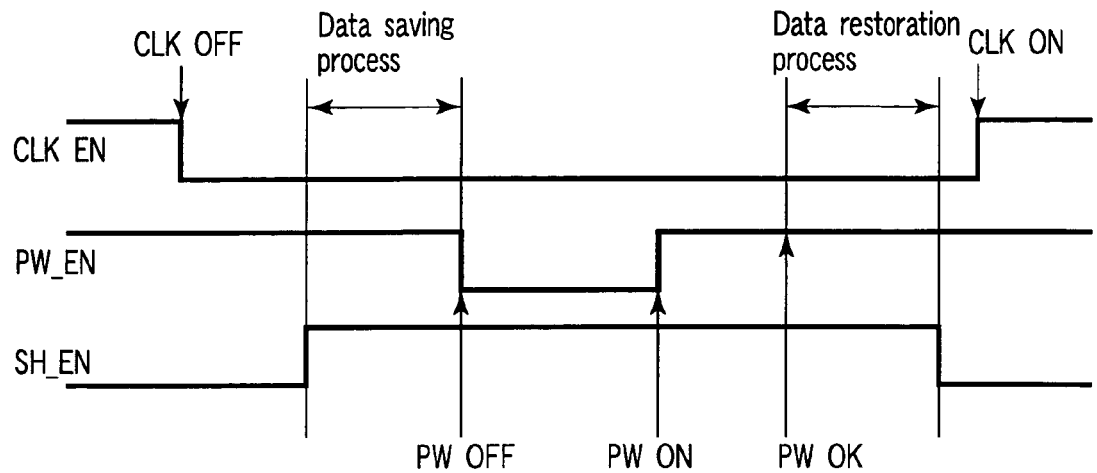
FIG. 6 is a sequence diagram showing the timings of data saving and restoration.

FIG. 6 is a sequence diagram showing the timings of saving and return of data. In FIG. 6, reference symbol CLK_EN denotes a clock supply enable signal; PW_EN, a power supply enable signal; and SH_EN, an enable signal of the saving unit 3. Before turning on or off the power supply of a certain functional module 2 (in this embodiment, the module A shown in FIG. 5), the PMU 1 outputs the enable signal (SH_EN) of the saving unit 3. After receiving from the saving unit 3 a response indicating that the operation of a data saving process or data restoration process is complete, the PMU 1 controls ON/OFF of the power supply by using the power supply enable signal (PW_EN).

A scan controller 10 shown in FIG. 5 usually performs control for switching the whole integrated circuit device to a scan test mode. When data saving or restoration by a shift operation using a scan chain 11 is to be performed, the scan controller 10 receives an instruction indicating this information from the PMU 1, and switches a functional module (in this embodiment, the module A) designated by the PMU 1 to the scan test mode by a test mode enable signal (NT).

Under the control of a controller 12, a pulse generator 13 of the saving unit 3 generates a necessary number of clock pulses to scan in necessary data in data saving or to scan out necessary data in data restoration, and outputs the pulses to the scan controller 10. This is equivalent to the saving clock signal or restoration clock signal described earlier. The controller 12 controls pulses generated by the pulse generator 13 and controls periodic error checking and correction in accordance with instructions from the PMU 1. The controller 12 is formed in the saving unit 3.

The operation of this embodiment having the above arrangement will be described below.

When the PMU 1 determines that the module A is not to be used for a while, the PMU 1 first instructs a clock control unit (ClkMgr) to stop clock supply to the module A. Upon receiving this instruction, the clock control unit stops clock supply by changing the clock supply enable signal (CLK_EN) to the module A to "L".

If the PMU 1 again determines from this state that the module A is not to be used for a while, the PMU 1 outputs the enable signal (SH_EN) of the saving unit 3 to make the saving unit 3 operable.

The scan controller 10 outputs the test mode enable signal (NT) to set the module A in the scan test mode. In addition, the path of clocks to be supplied to the module A is switched from the path of a clock pulse signal (normal_clk) in a normal scan test mode operation to the path of a clock pulse signal (pulse) supplied from the pulse generator 13 of the saving unit 3.

When the saving unit 3 is made operable by the enable signal (SH_EN), the pulse generator 13 starts generating a clock pulse signal (pulse). This clock pulse signal is supplied to the scan chain 11 of the module A via the scan controller 10 whose paths are switched as described above. In synchronism with this clock pulse signal, data held in flip-flops comprising scan chain 11 is shifted out in turn. The data shifted out from the module A is subjected to serial-to-parallel conversion by a serial-to-parallel converter and encoder 14 of the saving unit 3. Also, a check bit is generated by performing a correction encoding process for the data, and stored together with the save data in a save data storage area 6.

Note that the data size to be stored in the save data storage area 6 can be decreased by compressing the save data. This requires a compressor for compressing the save data stored in the save data storage area 6, and an expander for expanding the save data compressed by the compressor when the data is to be restored to the functional module.

If the save data storage area 6 is sufficiently large, the correction encoding process may be made unnecessary by the use of the majority method or the like. An embodiment using the majority method will be explained later (sixth embodiment). The serial-to-parallel conversion described above is performed in order to increase the power efficiency by lowering the operating frequency of the saving unit 3, and is not an essential process.

When data of all the flip-flops comprising scan chain 11 is completely saved, the pulse generator 13 stops generating the clock pulse signal. After that, the PMU 1 turns off the power supply of the module A by changing the power supply enable signal (PW_EN) of the module A to "L". By the processing up to this point, the data saving process is complete.

Periodic verification of save data will be described below. In the existing error correction process, the number of bits by which an error can be corrected has an upper limit. Since the number of errors in save data increases as the data saving time prolongs, errors must be corrected while they can be corrected. Therefore, while save data is held, i.e., while SH_EN is "H", the saving unit 3 desirably performs a periodic error checking and correction process as follows.

That is, while save data is held, the controller 12 of the saving unit 3 measures the time. When a predetermined time has elapsed, the controller 12 instructs the pulse generator 13 to generate a clock pulse signal. Upon receiving this instruction, the pulse generator 13 starts outputting a clock pulse signal. In synchronism with this signal, a decoder and parallel-to-serial converter 15 performs decoding and parallel-to-serial conversion for the saved data. Since error correction is performed when the data is decoded, the obtained data has no error. After that, the serial-to-parallel converter and encoder 14 performs serial-to-parallel conversion and encoding for the error-corrected data, and stores the encoded data in the save data storage area 6.

Restoration of save data will be explained below. If the PMU 1 determines that it is necessary to operate the module A, the PMU 1 starts supplying power to the module A by changing the power supply enable signal (PW_EN) to "H". When the module A is completely powered and stabilized, the PMU 1 instructs the saving unit 3 to restore save data (SH_Ctrl). Upon receiving this instruction, the pulse generator 13 of the saving unit 3 generates a clock pulse signal and outputs the signal to the scan controller 10. The decoder and parallel-to-serial converter 15 starts outputting data stored in the save data storage area 6 while performing decoding and parallel-to-serial conversion.

Since the module A is set in the scan test mode by the test mode enable signal (NT), the output data from the saving unit 3 is restored to the original flip-flop through the scan chain 11 in the same manner as in data saving. The pulse generator 13 already obtains, when the data is saved, information indicating the number of cycles during which the clock pulse signal is to be output. When all the data is output from the saving unit 3 and completely restored, the pulse generator 13 stops generating the clock pulse signal.

After that, the scan controller 10 stops outputting the test mode enable signal (NT), and sets the module A in the normal operation mode. In addition, the enable signal (SH_EN) of the saving unit 3 is changed to "L", and the power supply of the saving unit 3 is turned off. After these processes, the PMU 1 instructs a clock control unit to supply clocks to the module A. Upon receiving this instruction, the clock control unit changes the clock supply enable signal (CLK_EN) to "H". As a consequence, the module A resumes the normal operation.

In the above operation, the functional module clock is stopped and the power supply is turned off after a little while. This is so because it takes a long time to turn on the power supply once the power supply is turned off. When the functional module is to be frequently turned on and off, a general method is to control only the clock and keep the power supply ON.

Figure 7:
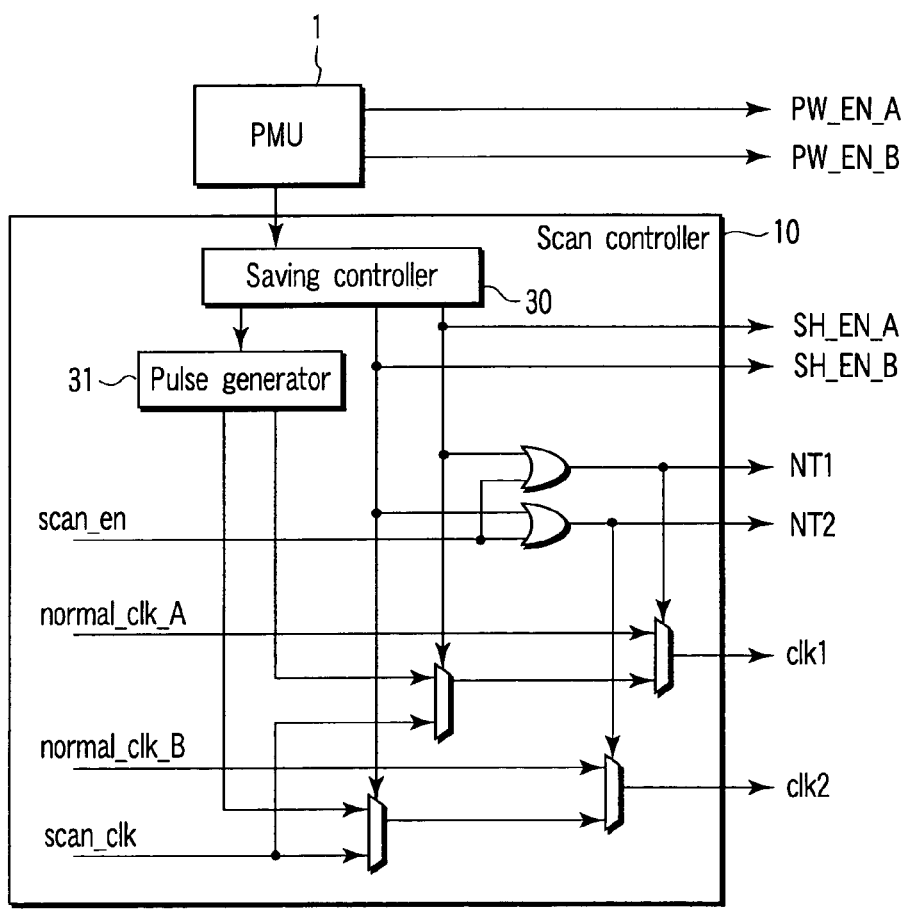
FIG. 7 is a block diagram which explains the second embodiment of the integrated circuit device according to the present invention, and which shows the arrangement of a scan controller.

In the above explanation, the pulse generator 13 is formed in the saving unit 3. However, as in the configuration shown in FIG. 7 of the second embodiment to be described below, the scan controller 10 may have an equivalent pulse generator 31 without forming the pulse generator 13 in the saving unit 3. Alternatively, the scan controller 10 includes the pulse generator 31 as shown in FIG. 7 of the second embodiment and the saving unit 3 also includes the pulse generator 13, so that the two pulse generators cooperate with each other. In this case, the pulse generator 31 of the scan controller 10 is exclusively used to save or restore data, and the pulse generator 13 of the saving unit 3 is exclusively used for periodic error checking and correction. These arrangements are only slightly different in control method, so those skilled in the art can easily make modifications of these arrangements.

Similar to the pulse generator, the controller 12 may also be included in the scan controller 10 or in each saving unit 3 as in this embodiment. That is, it is only necessary to be able to recognize instructions from the PMU 1 and execute the sequences of data saving and restoration and periodic error checking and correction.

Second Embodiment

FIG. 7 is a block diagram showing the arrangement of a scan controller according to the second embodiment. A scan controller 10 of this embodiment includes a saving controller 30 which outputs enable signals (SH_EN_A and SH_EN_B) of a saving unit 3. The saving controller 30, not a PMU 1, is the main component of saving or restoration control. This is the difference from the configuration of the first embodiment described above.

Similar to that of the first embodiment, the scan controller 10 of this embodiment also switches the whole integrated circuit device to a scan test mode in a normal operation. When data saving or restoration by a shift operation using a scan chain 11 is to be performed, the saving controller 30 receives an instruction indicating this information from the PMU 1. In accordance with the instruction, the saving controller 30 selects a corresponding functional module and outputs the enable signal (SH_EN_A or SH_EN_B). Also, the saving controller 30 outputs a test mode enable signal NT1 or NT2 to the selected functional module. In this manner, the functional modules can be selectively switched to the scan test mode. The second embodiment relates to a practical arrangement of mode switching for saving and restoration control performed for each functional module.

A clock pulse generator 31 generates a clock pulse signal by a necessary number of cycles. This clock pulse signal is given to a functional module scan chain through the same path as scan_clk shown in FIG. 7. Note that scan_clk is a clock pulse signal used in a normal scan test mode. Note also that normal_clk_A and normal_clk_B are clock pulse signals used in a normal operation mode different from the scan test mode and the saving or restoration mode.

FIG. 8 is a block diagram showing an arrangement in which a saving unit is formed in each of a plurality of functional modules.

The scan controller 10 shown in FIG. 7 is connected to these functional modules shown in FIG. 8.

As shown in FIG. 8, a saving unit A is formed for a module A, and a saving unit B is formed for a module B. In the module A, data (scan_out1) of all flip-flops forming a scan chain 11 is saved in the saving unit A. In the module B, data (scan_out2) of some flip-flops is not saved in the saving unit B, and only data (scan_out3) of other flip-flops is saved in the saving unit B.

When the saving unit is formed in each functional module, precise saving control as described above can be realized more easily than when the saving units A and B are combined into one saving unit.

Third Embodiment

FIG. 9 is a block diagram showing the third embodiment (data is saved to a dedicated area) of the integrated circuit device according to the present invention.

Reference numeral 20 in FIG. 9 denotes a memory as a functional module. A module A for writing and reading out data in and from the memory 20 includes an address generator 23 which generates an address for accessing the memory 20.

A saving unit 3 has a save data storage area 6 as a dedicated area different from the memory 20 as a functional module. The saving unit 3 can be formed in each module or for a plurality of functional modules. If the capacity of the save data storage area 6 can be increased, a correction encoding process may be made unnecessary by the use of the majority method or the like. In this case, a serial-to-parallel converter and encoder 14 and a decoder and parallel-to-serial converter 15 can be omitted. An embodiment using the majority method will be explained later (the sixth embodiment).

Also, if the save data storage area 6 is formed by an anti-soft-error latch, predetermined data reliability can be obtained without performing any periodic error checking and correction described above. In this case, the serial-to-parallel converter and encoder 14 and the decoder and parallel-to-serial converter 15 may be omitted.

The save data storage area 6 can also be used in a testing process by a BIST (Built In Self Test) circuit (to be described later). When the save data storage area 6 is formed by set/reset flip-flops, data can always be read out in the order of set flip-flops and reset flip-flops by giving an initialization signal to a save area if no data is saved in the save area. By using this characteristic, the save data storage area 6 can also be used as a ROM.

Fourth Embodiment

FIG. 10 is a block diagram showing the fourth embodiment (data is saved to a RAM or cache) of the integrated circuit device according to the present invention.

Unlike that of the third embodiment, a saving unit 500 of this embodiment does not have any dedicated area for data saving but uses another functional module (e.g., a memory 700) such as a RAM or cache memory. To access the memory 700 to save or restore data, the saving unit 500 includes an address generator 701. In this arrangement, a controller 12 is connected to a write enable signal line (wEN) and read enable signal line (rEN) for the memory 700.

Data saved from the functional module 2 is generated as write data containing save data and a corresponding check bit in one word via a serial-to-parallel converter and encoder 14, and written in an address designated by the address generator 701. To restore this data, the saving unit 500 must store the address on the memory where the saved data is stored. To this end, it is possible to form a memory area for storing the write address, or attach, to each address on the memory, information (tag) indicating whether data stored at the address is save data or normal data.

The serial-to-parallel converter and encoder 14 is connected to a write data signal line (write_data) for inputting a signal to the memory 700. A decoder and parallel-to-serial converter 15 is connected to a readout data signal line (read_data) for outputting a signal from the memory 700.

The saving unit 500 may be formed in each functional module or for a plurality of functional modules. Also, the saving unit 500 may access either one saving area (in this embodiment, the memory 700) or a plurality of saving areas. Furthermore, a saving area may differ from one saving unit to another.

Comparison of the third embodiment using a dedicated area as a data saving area and the fourth embodiment, i.e., merits and demerits resulting from the difference between data saving areas will be explained below.

In the third embodiment using a dedicated area as a data saving area, a saving area for storing save data and a correction code must be newly prepared, and this increases the area overhead. Note that the power overhead is small because the power supply of the saving unit is shut down while a functional module is in operation. On the other hand, in the fourth embodiment which uses a RAM or cache as a data saving area, it is only necessary to add to the existing memory an area for storing an address in which save data is stored or a storage area for a data determination ID for determining whether data held in each address of the memory is saved data or normal data. Accordingly, the area overhead is small. The power overhead is as small as in the third embodiment. Note that when data is to be saved, wasteful power consumption must be suppressed by operating only necessary portions on the memory.

Although there is almost no influence on the normal operation in the third embodiment, there is a little influence in the fourth embodiment. For example, the capacity of the normal path increases, or the number of logics (cache tags) for discriminating save data increases.

The ease with which error checking and correction (ECC) is realized is as follows. The third embodiment is preferable because the speed is not very important and so well-known ECC can be used. However, ECC must be periodically performed to prevent soft errors. In the fourth embodiment, if the capacity of the save data storage area is much larger than the save data amount, error checking and correction can easily be realized by the majority operation using data copies. This arrangement will be explained later in the sixth embodiment. It is also possible to use ECC in the normal operation.

In the third embodiment, control is very easy because the data saving area is completely independent of normal operation modules. In the fourth embodiment, control is slightly difficult when another module using the RAM or cache is in operation.

As described above, the fourth embodiment is advantageous in the area overhead and the easiness and simplicity of ECC resulting from the characteristics of the capacity. In other respects, the third embodiment in which data is saved to a dedicated area is more advantageous than the fourth embodiment (especially because the influence on the normal operation is small).

Fifth Embodiment

Figure 11:
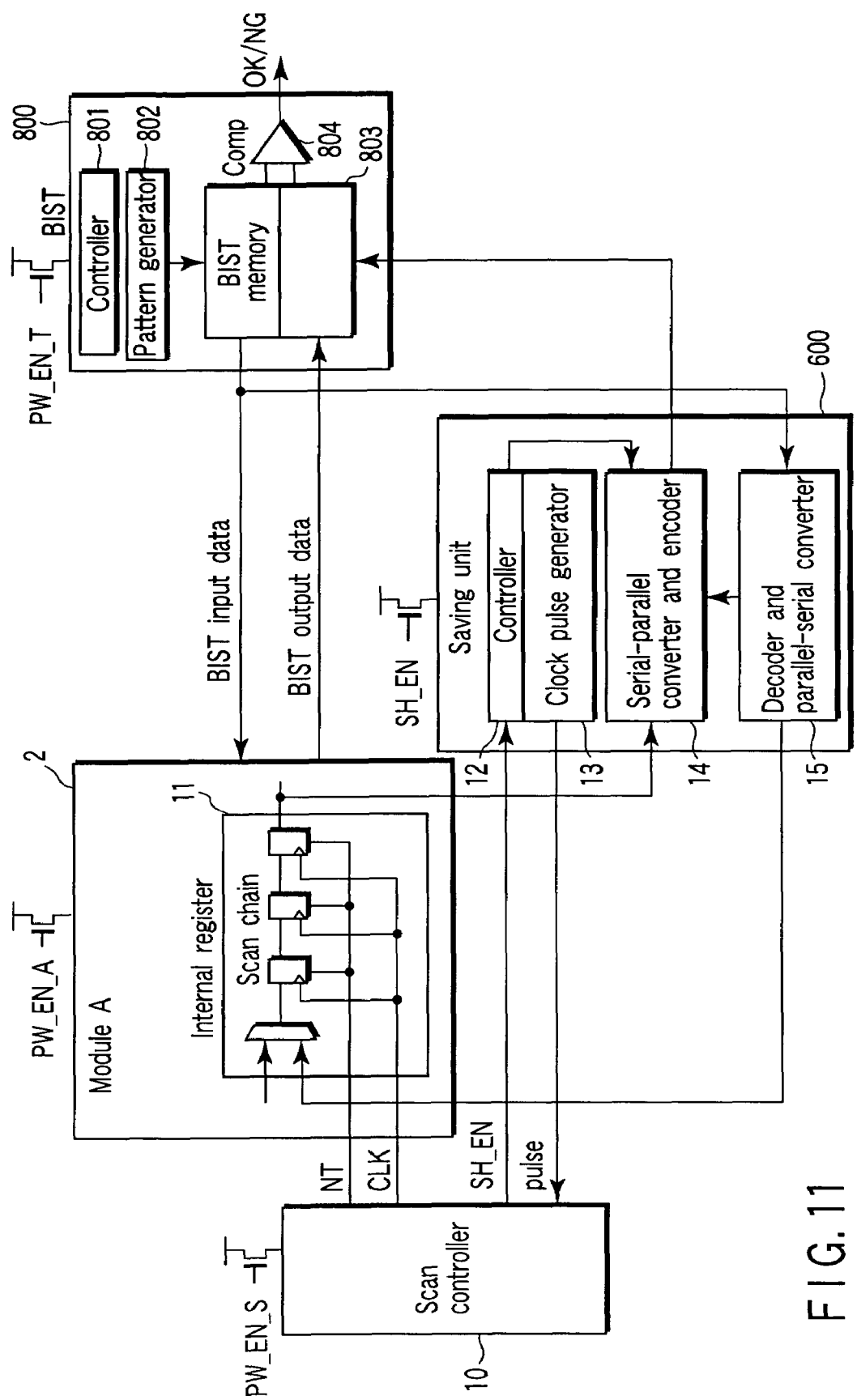
FIG. 11 is a block diagram showing the fifth embodiment (in which data is saved to a BIST memory) of the integrated circuit device according to the present invention.

FIG. 11 is a block diagram showing the fifth embodiment (in which data is saved to a BIST memory) of the integrated circuit device according to the present invention.

Similar to that of the fourth embodiment, a saving unit 600 of this embodiment does not have any dedicated area as a data saving area but uses another functional module as a saving area. This embodiment particularly uses a BIST (Built In Self Test) circuit as a data saving area. A BIST circuit 800 includes a controller 801, pattern generator 802, BIST memory 803, and comparator 804. More specifically, the BIST memory 803 is used as a data saving area. BIST is well known, so a detailed explanation thereof will be omitted. Under the control of the controller 801, the pattern generator 802 generates a test pattern and gives it as input data (BIST_input_data) to a module 2. The BIST circuit 800 receives the result as output data (BIST_output_data) from the module 2. The input data and output data are read out from the BIST memory 803 and compared by the comparator 804, thereby determining the presence/absence of a failure.

If the capacity of the BIST memory 803 is sufficiently large, the area overhead can be decreased as in the fourth embodiment by using this memory as a data saving area as in this embodiment. Note that this embodiment can also be so modified as to use an internal test mode memory area which is not used in the normal operation, instead of the BIST circuit.

Sixth Embodiment

Figure 12:
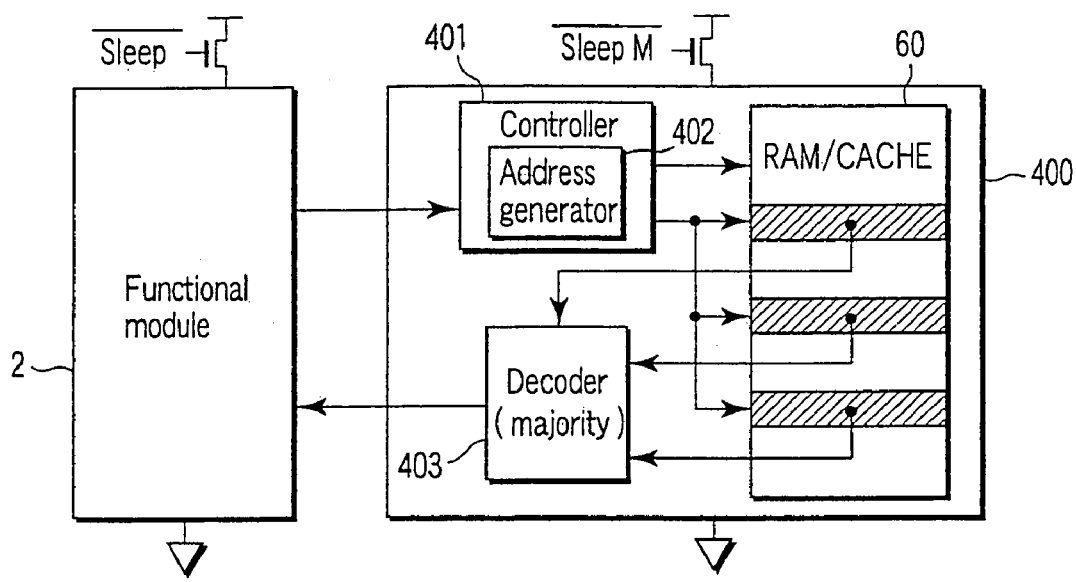
FIG. 12 is a block diagram which shows the sixth embodiment of the integrated circuit device according to the present invention, and which explains error checking and correction by the majority operation.
Figure 13:
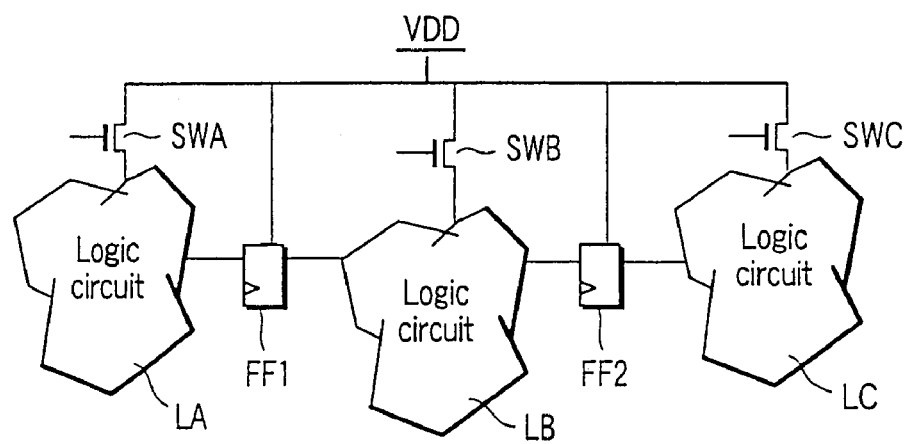
FIG. 13 is a circuit diagram for explaining power supply control according to prior art.

FIG. 12 is a block diagram which shows the sixth embodiment of the integrated circuit device according to the present invention, and which explains error checking and correction by the majority operation.

A saving unit 400 of this embodiment includes a controller 401, save data storage area 60, and decoder 403. The controller 401 includes an address generator 402 for generating an address for accessing the save data storage area 60 which is a large-capacity RAM or cache memory. Referring to FIG. 12, the save data storage area 60 is formed as a dedicated area in the saving unit 400. However, it is also possible to use another functional module or BIST memory as described above, instead of this dedicated area.

When data is saved from a functional module 2, the controller 401 generates a plurality of copies of the saved data. These copied data are stored in different areas of the save data storage area 60. When the data saved in this manner is to be restored to the functional module 2, the decoder 403 as an error checking and correction unit reads out all the copied data from the save data storage area 60 and performs the majority operation. Even if a soft error or the like has occurred during the data saving, data obtained as a result of the majority operation is obtained as original data in which this error is corrected. This embodiment as described above is preferable because it obviates the periodic error checking and correction process as described previously.

As has been described above, the present invention can provide an integrated circuit device which can flexibly control power supply for each functional module in order to reduce the power consumption and can also control data saving and restoration accordingly, and which can be implemented at low cost without lowing the reliability of data saving. In particular, even when the voltage supplied to the data saving area is decreased to a minimum voltage necessary for data holding in order to reduce the power consumption, a decrease in reliability of saved data caused by, e.g., a so-called soft error can be suppressed by an arrangement which performs error checking and correction in the data saving area.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. An integrated circuit device comprising:
    at least one functional module which has a plurality of flip-flops forming a scan chain, wherein the functional module performs a saving operation by outputting data in the flip-flops by a shift operation using the scan chain synchronized with a saving clock signal, and performs a restoring operation by restoring, to the flip-flops, the saved data by a second shift operation using the scan chain synchronized with a restoration clock signal;
    a power supply control unit which selects one of the functional modules, and controls stop and resumption of the power supply to the selected functional module;
    a clock signal generator which generates the saving clock signal and restoration clock signal for the functional module selected by the power supply control unit;
    a scan controller which, in the saving operation or restoring operation, sets the functional module selected by the power supply control unit to a scan test mode, and selects the saving clock signal or restoration clock signal generated by the clock signal generator as a clock signal to be supplied for the shift operation using scan chain;
    a shift register including a plurality of flip-flops wherein the shift register stores the save data output from the functional module selected by the power supply control unit by the shift operation using the scan chain synchronized with the saving clock signal; and
    an error checking and correction unit which performs error checking and correction for the save data stored in the shift register when the save data is to be restored to the flip-flops of the functional module by the second shift operation using the scan chain synchronized with the restoration clock signal, wherein the number of the second shift operations equals the number of the flip-flops of the functional moduule.

2. A device according to claim 1, wherein the clock signal generator generates a clock signal for use in periodic error checking and correction performed in the shift register, the number of cycles of the clock signal equals the number of the flipflops of the shift register.

3. The device according to claim 1, wherein the error checking and correction unit comprises:
    an encoder which generates an error correction code from the save data, and writes the error correction code in the shift register, the encoder generating the error correction code when the save data is accumulated in a subset including "n" numbers of the flip-flops of the shift register; and
    a decoder which reads out the stored save data and the corresponding error correction code from the shift register, and outputs error-corrected data.

4. A device according to claim 1, wherein the error checking and correction unit periodically performs error checking and correction for the save data stored in the shift register while a third shift operation is performed only in the shift register.

* * * * *

UNITED STATES PATENT AND TRADEMARK OFFICE
CERTIFICATE OF CORRECTION

PATENT NO. : 7,269,780 B2 Page 1 of 1
APPLICATION NO. : 10/674951
DATED : September 11, 2007
INVENTOR(S) : Y. Arima et al.

It is certified that error appears in the above-identified patent and that said Letters Patent is hereby corrected as shown below:

| COLUMN | LINE | ERROR |
|---|---|---|
| (56) Pg. 2, col. 1 | Refs. Cited (U.S. Pats., Item 10) | "Wood et al." should read --Woods et al.-- |
| 16 (Claim 1, | 10 line 22) | "scan chain;" should read --the scan chain;-- |
| 16 (Claim 1, | 23 line 35) | "moduule." should read --module.-- |

Signed and Sealed this

Fifth Day of August, 2008

JON W. DUDAS
*Director of the United States Patent and Trademark Office*